(12) United States Patent
Noldus et al.

(10) Patent No.: US 11,588,898 B2
(45) Date of Patent: Feb. 21, 2023

(54) CONTROLLING COMMUNICATION SESSION HANDLING AT A USER EQUIPMENT USING A SCRIPT GENERATED BY AN APPLICATION SERVER

(71) Applicant: Telefonaktiebolaget LM Ericsson (publ), Stockholm (SE)

(72) Inventors: Rogier August Caspar Joseph Noldus, Goirle (NL); Mariarosaria Romano, Scafati (IT); Maurizio Colucci, Salerno (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/297,667

(22) PCT Filed: Dec. 6, 2018

(86) PCT No.: PCT/EP2018/083894
§ 371 (c)(1),
(2) Date: May 27, 2021

(87) PCT Pub. No.: WO2020/114604
PCT Pub. Date: Jun. 11, 2020

(65) Prior Publication Data
US 2022/0046097 A1    Feb. 10, 2022

(51) Int. Cl.
*G06F 15/16*    (2006.01)
*H04L 67/141*    (2022.01)
(Continued)

(52) U.S. Cl.
CPC ........ *H04L 67/141* (2013.01); *H04L 65/1063* (2013.01); *H04L 65/1073* (2013.01);
(Continued)

(58) Field of Classification Search
CPC ............... H04L 67/141; H04L 65/1006; H04L 65/1063; H04W 76/10
(Continued)

(56) References Cited

U.S. PATENT DOCUMENTS 8,612,993 B2    12/2013    Grant et al.
8,725,849 B1 *    5/2014    Lloyd ................. G06F 16/9574
                                         709/227

(Continued)

FOREIGN PATENT DOCUMENTS

WO          0147213 A1    6/2001
WO    2005029809 A1    3/2005
WO    2008154953 A1    12/2008

*Primary Examiner* — Hee Soo Kim
(74) *Attorney, Agent, or Firm* — Coats & Bennett, PLLC

(57) ABSTRACT

An application server generates a script and transmits the script to a first user equipment. The script is transmitted to the first user equipment in a request for establishment of a communication session between the first user equipment and a second user equipment. Execution of the script by the first user equipment controls handling of the communication session between the first user equipment and the second user equipment. Thus, by sending the script to the first user equipment, the application server controls the manner in which the first user equipment handles the communication session.

18 Claims, 10 Drawing Sheets

(51) Int. Cl.
*H04W 76/10* (2018.01)
*H04L 65/1063* (2022.01)
*H04L 65/1073* (2022.01)
*H04L 67/02* (2022.01)
*H04L 65/1104* (2022.01)

(52) U.S. Cl.
CPC .......... *H04L 65/1104* (2022.05); *H04L 67/02* (2013.01); *H04W 76/10* (2018.02)

(58) Field of Classification Search
USPC ........................................................ 709/227
See application file for complete search history.

(56) References Cited

U.S. PATENT DOCUMENTS

| | | | |
|---|---|---|---|
| 2002/0169776 A1* | 11/2002 | Tuunanen | H04L 65/1096 707/999.009 |
| 2011/0113141 A1* | 5/2011 | Veenstra | H04L 63/123 709/226 |
| 2012/0303831 A1* | 11/2012 | Toshniwal | H04L 65/1069 709/229 |
| 2017/0251062 A1* | 8/2017 | Lu | H04L 63/205 |
| 2018/0159901 A1* | 6/2018 | Chatras | H04L 67/141 |

* cited by examiner

CONTROLLING COMMUNICATION SESSION HANDLING AT A USER EQUIPMENT USING A SCRIPT GENERATED BY AN APPLICATION SERVER

TECHNICAL FIELD

The present idea relates to an application server, a user equipment, a network and methods of operating the same for controlling handling of a communication session.

BACKGROUND

A communication session, such as a call, can be established by an application server towards user equipment (e.g. an end-user terminal or a mobile terminal). The establishment of a communication session may take place within the context of a special service. A special service may be, for example, a service (e.g. a group or non-group service) whereby a call is established to one or more user equipments for the playing of an announcement towards the user of that respective user equipment. The user may, for such service, answer the call and listen to the announcement. Thus, in general, the user ultimately decides how the communication session is to be handled. This can be problematic as it means that the establishment of a communication session with a user equipment is dependent on user behaviour.

An existing technique aimed at addressing this involves configuring the user equipment to automatically answer an incoming communication session. However, the issue with this technique is that such a setting on the user equipment is static in that all incoming communication sessions (irrespective of the caller) are automatically answered. Some user equipments (e.g. mobile phones) may be programmed to handle incoming communication sessions in a certain manner. For example, certain conditions may apply for handling an incoming communication session, such as only incoming communication sessions that satisfy certain criteria are automatically answered. However, there still remains the issue that such a setting on the user equipment is static in that the behaviour of the user equipment, with respect to answering the communication session, is still dependent on the manner in which the user equipment is programmed to handle incoming communication sessions.

Thus, in existing techniques, the user equipment that initiates a communication session is bound by the parameters of the receiving user equipment. As such, there is a need for an improved technique for controlling the handling of communications sessions, which overcomes at least some of the problems associated with existing techniques.

SUMMARY

It is an object to obviate or eliminate at least some of the above disadvantages associated with existing techniques and provide an improved technique for controlling handling of communications sessions.

Therefore, according to an aspect of the idea, there is provided a method of operating an application server of a network for controlling handling of a communication session. The method comprises generating a script executable by a first user equipment, wherein execution of the script at the first user equipment controls handling of a communication session between the first user equipment and a second user equipment. The method also comprises transmitting an establishment request to the first user equipment for the establishment of the communication session between the first user equipment and the second user equipment. The establishment request comprises the script for execution at the first user equipment.

The idea thus provides an improved technique for controlling handling of communications sessions. This technique is improved as it is more dynamic. As the script is generated by the application server and transmitted to the first user equipment in the establishment request, the application server has more control over the manner in which the first user equipment handles the communication session and is not bound by the parameters of the first user equipment. Thus, for example, if the second user equipment wants a specific behaviour to occur at the first user equipment of a specific communication session, this can be achieved by the application server operating to generate an appropriate script. The application server can, with full security, obtain control of the manner in which a communication session is handled at the first user equipment, which is the receiver of that communication session.

Moreover, as the script is comprised in the establishment request, the transfer of the script to the first user equipment is secure (e.g. due to the intrinsic security of the network for such signalling) and the script is also available for immediate execution.

There is no need for additional signalling as the establishment request is used to transmit the script. The idea allows for adaptive and flexible execution of a communication session.

In some embodiments, the method may comprise receiving, from the first user equipment, an indication of one or more capabilities of the first user equipment and generating the script executable by the first user equipment based on the one or more capabilities of the first user equipment. In this way, the script can be fully tailored to the first user equipment and may exploit the one or more capabilities of the first user equipment.

In some embodiments, the method may comprise receiving, from the first user equipment, a registration request for the first user equipment to register with the application server. In these embodiments, the registration request may comprise the indication of the one or more capabilities of the first user equipment. In this way, no additional signalling is required to provide the one or more capabilities. Advantageously, the one or more capabilities of the first user equipment are known by the application server at the moment of communication session establishment. The application server can then immediately take these one or more capabilities into account (e.g. exploit these one or more capabilities) in the generation of the script for execution at the first user equipment, rather than the application server requesting the one or more capabilities after the communication session is established.

In some embodiments, the method may comprise generating the script executable by the first user equipment based on one or more current conditions in the network. In this way, the script can be adaptive. That is, the script can be adapted to the current (or actual) service requirements of the network. In this way, for example, the script can advantageously take into consideration whether the network currently supports certain media functionality, such as video calling or real-time video streaming.

In some embodiments, the one or more conditions in the network may comprise any one or more of a time in a geographical area of the network, a date and/or time in the network, a location of the first user equipment in the network, a location of the second user equipment in the network, and one or more other communication sessions established in the network. In this way, for example, in the case of high network usage (e.g. a large number of current communication sessions), the script can omit certain functionality, so as to prevent further increase in network resource usage.

In some embodiments, the method may comprise determining whether the first user equipment and/or second user equipment is trusted and, if the first user equipment and/or second user equipment is trusted, transmitting the establishment request comprising the script to the first user equipment. In this way, a protection mechanism is provided. In particular, communication sessions are only established when the first user equipment and/or second user equipment is trusted, thereby improving the security within the network.

In some embodiments, the establishment request may comprise a session initiation protocol, SIP, session establishment request and the communication session comprises a SIP communication session. Alternatively or in addition, in some embodiments, the establishment request may comprise a hypertext transfer protocol, HTTP, session establishment request and the communication session comprises an HTTP communication session. In this way, as SIP is used for the establishment and control of multimedia communication sessions, the idea may be used for script-driven multimedia communication session establishment. On the other hand, as HTTP is predominantly used as a control plane protocol for hypertext-based communication sessions, the idea may be used for script-driven hypertext-based communication sessions.

According to another aspect of the idea, there is provided an application server of a network. The application server comprises processing circuitry configured to generate a script executable by a first user equipment, wherein execution of the script at the first user equipment controls handling of the communication session between the first user equipment and a second user equipment. The processing circuitry is also configured to transmit an establishment request to the first user equipment for the establishment of the communication session between the first user equipment and the second user equipment, wherein the establishment request comprises the script for execution at the first user equipment. The idea thus provides the advantages discussed earlier in respect of the method of operating the application server.

According to another aspect of the idea, there is provided a method of operating a first user equipment of a network for controlling handling of a communication session. The method comprises receiving an establishment request from an application server for the establishment of a communication session between the first user equipment and a second user equipment, wherein the establishment request comprises a script executable by the first user equipment. The method also comprises executing the script. The execution of the script controls handling of the communication session at the first user equipment. The idea thus provides the advantages discussed earlier in respect of the method of operating the application server.

In some embodiments, the method may comprise transmitting, to the application server, an indication of one or more capabilities of the first user equipment. In these embodiments, the establishment request may comprise a script generated based on the one or more capabilities of the first user equipment. In this way, the script can be fully tailored to the first user equipment and may exploit the one or more capabilities of the first user equipment.

In some embodiments, the method may comprise transmitting, to the application server, a registration request for the first user equipment to register with the application server. In these embodiments, the registration request may comprise the indication of the one or more capabilities of the first user equipment. In this way, no additional signalling is required to provide the one or more capabilities. Advantageously, the one or more capabilities of the first user equipment are known by the application server at the moment of communication session establishment. The application server can immediately take these one or more capabilities into account (e.g. exploit these one or more capabilities) in the generation of the script for execution at the first user equipment, rather than the application server requesting the one or more capabilities after the communication session is established.

In some embodiments, the method may comprise, prior to executing the script, determining that the establishment request is a multipart establishment request. Thus, the script can be comprised in an establishment request with other information, e.g. a session description protocol (SDP) offer. In this way, other information (e.g. the SDP offer) and the script can be comprised in a single establishment request, which consists of multiple parts. The first user equipment, which is the receiver of the establishment request can hence determine, upon receiving the establishment request, that it constitutes a multipart request.

In some embodiments, the execution of the script at the first user equipment may control handling of the communication session by controlling the first user equipment to accept the establishment of the communication session, end the communication session at a predefined time, and/or render media at a user interface of the first user equipment. Thus, for example, the communication session may, under certain conditions, be automatically accepted by the first user equipment, automatically ended by the first user equipment, and/or may automatically render media at a user interface of the first user equipment, without requiring human intervention. In this way, a fast response and reaction by the user equipment can be provided to improve the service.

In some embodiments, the method may comprise receiving a user input associated with the handling of the communication session. In this way, the user is able to retain some control over the handling of the communication session establishment and continuation thereof. For example, the user may, when required, terminate the communication session that resulted from execution of the script.

In some embodiments, the method may comprise caching the script in a cache of scripts, wherein each script is cached with a unique identifier. In this way, the script may be used in subsequent communication sessions without having to be retransmitted, thereby saving network capacity.

In some embodiments, the script may have an associated validity period and the method may comprise purging the script from the cache on expiry of the associated validity period. In this way, cached scripts (e.g. those that are not used frequently) will not unnecessarily consume memory in the first user equipment. Moreover, if the application server, at some time, modifies a particular script, the validity period can ensure that the unmodified script is removed from the cache and thus only the most recent scripts are retained in the cache.

According to another aspect of the idea, there is provided a first user equipment of a network. The first user equipment comprises processing circuitry configured to receive an establishment request from an application server for the establishment of a communication session between the first user equipment and a second user equipment, wherein the establishment request comprises a script executable by the first user equipment. The processing circuitry is also configured to execute the script. The execution of the script controls handling of the communication session at the first user equipment. The idea thus provides the advantages discussed earlier in respect of the method of operating the application server.

In some embodiments, the first user equipment may comprise a communications interface configured to receive a user input associated with the handling of the communication session. In this way, the user is able to retain some control over the handling of the communication session establishment and continuation thereof by asserting control over the communication session through the communications interface, such as through a keypad and touch screen of the user interface. For example, the user may, when required, terminate the communication session that resulted from execution of the script.

According to another aspect of the idea, there is provided a network comprising any one or more of an application server as described earlier and a first user equipment as described earlier. The idea thus provides the advantages discussed earlier in respect of the method of operating the application server.

According to another aspect of the idea, there is provided a computer program product comprising a carrier containing instructions for causing processing circuitry to perform a method as described earlier. The idea thus provides the advantages discussed earlier in respect of the method of operating the application server.

Therefore, an improved technique for controlling handling of communications sessions is provided.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

As mentioned earlier, there is described herein an improved technique for controlling handling of communication sessions. Herein, references to communication sessions can include any form of communication session. Examples include, but are not limited to, a call (e.g. an audio and/or video call), a bowser session, a messaging session, or any other form of communication session. The communication session referred to herein is between a first user equipment and a second user equipment via an application server of a network. The communication session originates from the second user equipment.

Figure 1:
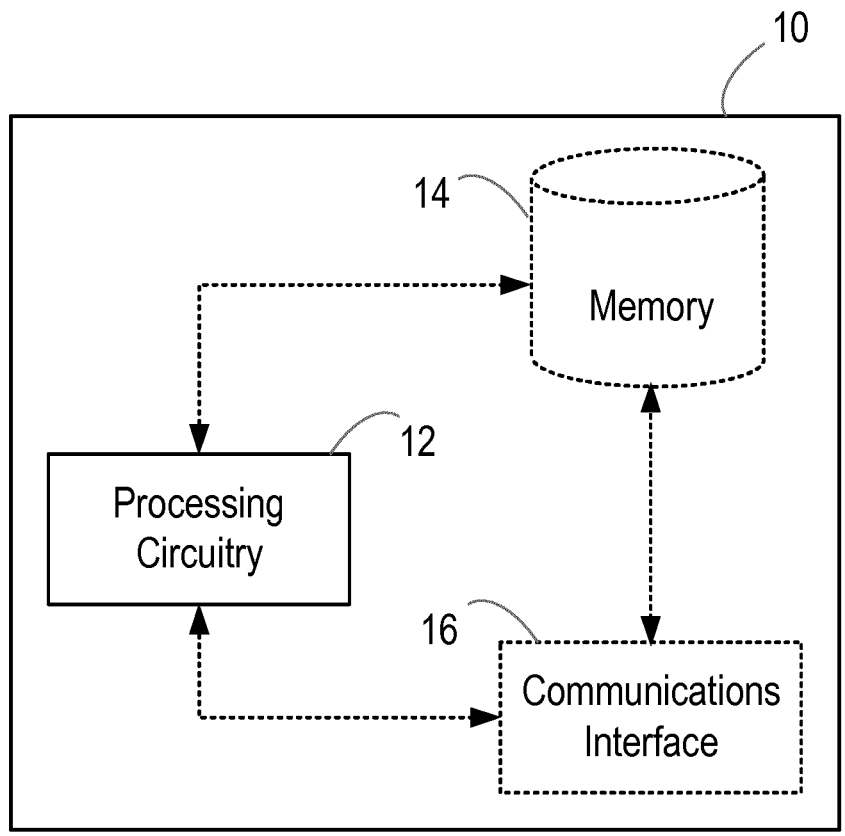
FIG. 1 is a block diagram illustrating an application server according to an embodiment.

FIG. 1 illustrates an application server (AS) 10 of a network in accordance with an embodiment. The application server 10 may also be referred to as a network-based application server. Generally, the application server 10 manages the establishment of a communication session between a first user equipment and a second user equipment. More specifically, the application server 10 serves the second user equipment in establishing a communication session with the first user equipment.

In some embodiments, the application server 10 can be a server through which one or more applications run. Examples of an application include, but are not limited to, a voice application, a video application, a messaging application, or any other application. In some embodiments, the communication session referred to herein may be established in respect of one or more applications. In these embodiments, the one or more applications may run on the second user equipment. The application server may be an application server of a service provider or operator.

As illustrated in FIG. 1, the application server 10 comprises processing circuitry (or logic, e.g. service logic) 12. The processing circuitry 12 controls the operation of the application server 10 and can implement the method described herein in relation to the application server 10. The processing circuitry 12 can comprise one or more processors, processing units, multi-core processors or modules that are configured or programmed to control the application server 10 in the manner described herein. In particular implementations, the processing circuitry 12 can comprise a plurality of software and/or hardware modules that are each configured to perform, or are for performing, individual or multiple steps of the method described herein in relation to the application server 10.

Briefly, the processing circuitry 12 of the application server 10 is configured to generate a script executable by the first user equipment, where execution of the script at the first user equipment controls handling of the communication session between the first user equipment and the second user equipment. The processing circuitry 12 of the application server 10 is also configured to transmit an establishment request to the first user equipment for the establishment of the communication session between the first user equipment and the second user equipment. The establishment request comprises the script for execution at the first user equipment. Herein, the establishment request may also be referred to as a session establishment request. The establishment request can be an establishment request message (or a session establishment request message).

As illustrated in FIG. 1, the application server 10 may optionally comprise a memory 14. The memory 14 of the application server 10 can comprise a volatile memory or a non-volatile memory. In some embodiments, the memory 14 of the application server 10 may comprise a non-transitory media. Examples of the memory 14 of the application server 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the application server 10 can be connected to the memory 14 of the application server 10. In some embodiments, the memory 14 of the application server 10 may be configured to store program code or instructions that can be executed by the processing circuitry 12 of the application server 10 to perform the method described herein in relation to the application server 10. Alternatively or in addition, the memory 14 of the application server 10 can be configured to store any requests, responses, indications, information, data, notifications, signals, or similar, that are described herein. The processing circuitry 12 of the application server 10 may be configured to control the memory 14 of the application server 10 to store any requests, responses, indications, information, data, notifications, signals, or similar, that are described herein. In some embodiments, for example, the processing circuitry 12 of the application server 10 may be configured to control the memory 14 of the application server 10 to store any one or more of the script executable by the first user equipment (and/or a unique identifier for the script) and the establishment request that is transmitted to the first user equipment.

In some embodiments, as illustrated in FIG. 1, the application server 10 may optionally comprise a communications interface 16. The communications interface 16 of the application server 10 can be connected to the processing circuitry 12 of the application server 10 and/or the memory 14 of the application server 10. The communications interface 16 of the application server 10 may be operable to communicate with other nodes of the network (such as the nodes of the network that will be described later, or any other nodes of the network, or any combination of other nodes of the network). For example, the communications interface 16 of the application server 10 can be configured to transmit to and/or receive from other nodes requests, responses, indications, information, data, notifications, signals, or similar, that are described herein. The processing circuitry 12 of the application server 10 may be configured to control the communications interface 16 of the application server 10 to transmit to and/or receive from other nodes requests, responses, indications, information, data, notifications, signals, or similar, that are described herein.

It will be appreciated that FIG. 1 only shows the components required to illustrate an embodiment of the application server 10 and, in a practical implementation, the application server 10 may comprise additional or alternative components to those shown.

Figure 2:
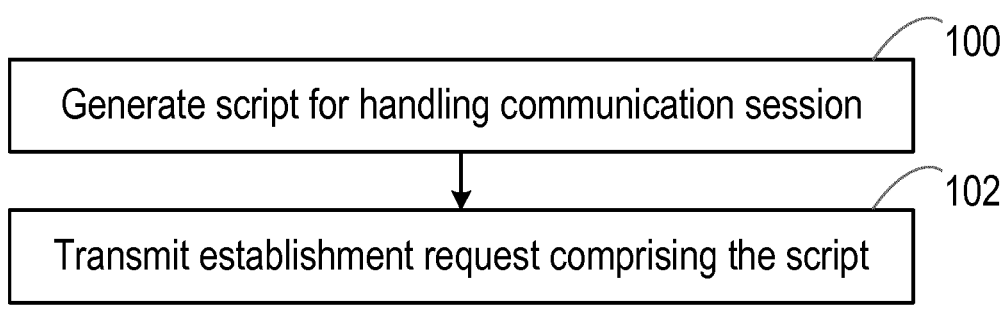
FIG. 2 is a block diagram illustrating a method of operating an application server according to an embodiment.

FIG. 2 is a flowchart illustrating a method of operating the application server 10 of the network for controlling handling of a communication session in accordance with an embodiment. The method of FIG. 2 can be performed by or under the control of the processing circuitry 12 of the application server 10.

With reference to FIG. 2, at block 100, a script executable by a first user equipment is generated. More specifically, the processing circuitry 12 of the application server 10 generates the script. The execution of the script at the first user equipment controls handling of a communication session between the first user equipment and a second user equipment. In some embodiments, the script may comprise a set of instructions to control handling of the communication session between the first user equipment and the second user equipment.

Although not illustrated in FIG. 2, in some embodiments, the method may comprise receiving, from the first user equipment, an indication of one or more (e.g. mandatory) capabilities of the first user equipment. Examples of the one or more capabilities of the first user equipment may comprise, but are not limited to, any one or more of the capability of the user equipment to render media (e.g. the display characteristics of the user equipment, such as the size of the display), the capability of one or more auxiliary devices (e.g. integrated in or connected to the first user equipment, such as a camera and/or high definition display) to be controlled by execution of the script at the first user equipment. In some of these embodiments, the script executable by the first user equipment may be generated based on (or adapted in accordance with) the one or more capabilities of the first user equipment. Thus, in some embodiments, the processing circuitry 12 of the application server 10 can be configured to receive, from the first user equipment (e.g. via the communications interface 16 of the application server 10), an indication of one or more capabilities of the first user equipment and generate the script executable by the first user equipment based on (or adapted in accordance with) the one or more capabilities of the first user equipment. In some embodiments, the indication of the one or more capabilities of the first user equipment may be in the form of a profile for the first user equipment. There may be different versions of the profile, such as "Version 1.0" (and subsequently "Version 2.0", etc.).

In some embodiments, the method may comprise receiving, from the first user equipment, a registration request (or an invite request, e.g. a session initiation protocol (SIP) invite request, a hypertext transfer protocol (HTTP) invite request, and/or similar) for the first user equipment to register with the application server 10. Thus, according to some embodiments, the processing circuitry 12 of the application server 10 can be configured to receive, from the first user equipment (e.g. via the communications interface 16 of the application server 10), a registration request for the first user equipment to register with the application server 10. In some of these embodiments, the registration request can comprise the indication of the one or more capabilities of the first user equipment.

Alternatively or in addition to the script executable by the first user equipment being generated based on (or adapted in accordance with) the one or more capabilities of the first user equipment, in some embodiments, the script executable by the first user equipment may be generated based on (or adapted in accordance with) one or more current conditions in the network. Thus, in some embodiments, the processing circuitry 12 of the application server 10 can be configured to generate the script executable by the first user equipment based on (or adapted in accordance with) the one or more current conditions in the network and/or the one or more capabilities of the first user equipment. For example, the one or more conditions in the network may comprise any one or more of a time in a geographical area of the network, a date and/or time in the network, a location of the first user equipment in the network, a location of the second user equipment in the network, one or more other communication sessions established in the network, or any other conditions in the network, or any combination of conditions in the network. Alternatively or in addition, the script executable by the first user equipment may be generated based on (or adapted in accordance with) one or more preferences of a user of the first user equipment and/or one or more preferences of a user of the second user equipment.

In some embodiments, the first user equipment may be configured to support one or more (e.g. optional) capabilities associated with a communication session, which do not need to be communicated to the application server 10. In some embodiments, when generating the script, the application server 10 (or an application programming interface (API) of the application server 10) may include in the script instructions corresponding to one or more capabilities associated with the communication session. Examples of the one or more capabilities associated with the communication session may comprise, but are not limited to, any one or more of the capability to generate an answer to the establishment request (e.g. 183 Session Progress, 180 Ringing, 200 Ok, which may comprise a session description protocol (SDP) answer, or any other answer), the capability to generate a provisional response or acknowledgement (e.g. Prack or any other provisional response), the capability to generate one or more transactions (e.g. Update, re-Invite, or any other transaction), the capability to terminate the communication session, the capability for user interaction with the communication session, or any other capability, or any combination of capabilities, associated with the communication session.

Returning back to FIG. 2, at block 102, an establishment request is transmitted to the first user equipment for the establishment of the communication session between the first user equipment and a second user equipment. More specifically, the processing circuitry 12 of the application server 10 transmits (e.g. via the communications interface 16 of the application server 10) the establishment request to the first user equipment. In some embodiments, the establishment request may be transmitted via an application programming interface (API) of the application server 10.

As mentioned earlier, the establishment request comprises the script for execution at the first user equipment. For example, in some embodiments, the script can be included in (e.g. embedded in) the establishment request for execution at the first user equipment. In some embodiments, the script may be included in (e.g. embedded in) the body of the establishment request. In some embodiments, the script itself may take the form of a hypertext markup language (HTML) script or any other form. The script can be directly related to the processing of a protocol message that constitutes the establishment request for the establishment of the communication session.

As mentioned earlier, the communication session referred to herein is between the first user equipment and a second user equipment via the application server 10. In some embodiments, the establishment request comprising the script may be transmitted to the first user equipment only if the first user equipment and/or second user equipment is trusted. Thus, in some of embodiments, the application server 10 may be configured to determine whether the first user equipment and/or second user equipment is trusted and, if the first user equipment and/or second user equipment is trusted, transmit the establishment request comprising the script to the first user equipment. In some embodiments, for example, the establishment of a script-driven communication session between the first user equipment and the second user equipment may take place only when both the first user equipment and the second user equipment are trusted. On the other hand, if the first user equipment and/or second user equipment is not trusted, the application server 10 may prevent the transmission of the establishment request comprising the script to the first user equipment. For example, the application server 10 may remove the script from the establishment request.

In some embodiments, the application server 10 may be configured to determine whether the first user equipment is trusted by being configured to authenticate or verify the first user equipment (e.g. using an identity of the first user equipment). Similarly, in some embodiments, the application server 10 may be configured to determine whether the second user equipment is trusted by being configured to authenticate or verify the second user equipment (e.g. using an identity of the second user equipment). A person skilled in the art will be aware of various techniques that can be used for this authentication or verification, such as applying a hypertext transfer protocol (HTTP) based authentication or verification on a P-asserted-Identity used to convey the identity of the second user equipment, which is a technique known as "signature-based handling of asserted information using tokens". In this way, a protection mechanism is provided by the application server 10.

The establishment request may be transmitted using a session initiation protocol (SIP), a hypertext transfer protocol (HTTP), and/or any other suitable protocol. Thus, in some embodiments, the establishment request referred to herein may comprise a session initiation protocol (SIP) session establishment request and the communication session may comprise a SIP communication session. Alternatively or in addition, in some embodiments, the establishment request referred to herein may comprise a hypertext transfer protocol (HTTP) session establishment request and the communication session may comprise a HTTP communication session. In this way, as SIP is used for the establishment and control of multimedia communication sessions, the idea described herein can be used for script-driven multimedia communication session establishment. On the other hand, as HTTP is predominantly used as a control plane protocol for hypertext-based communication sessions, the idea described herein can be used for script-driven hypertext-based communication sessions. In some embodiments, a SIP based communication session may be augmented with an HTTP based communication session. Hence, in some embodiments, the inclusion of a script in an HTTP session establishment request can extend the idea described herein to multimedia communication sessions that are either initiated through SIP or initiated through HTTP. In some embodiments, the establishment request may be a multipart (or multibody) establishment request. That is, the establishment request may comprise multiple parts (or multiple bodies) according to some embodiments. For example, in some embodiments, the establishment request may comprise a session description protocol (SDP) in addition to the script.

Figure 3:
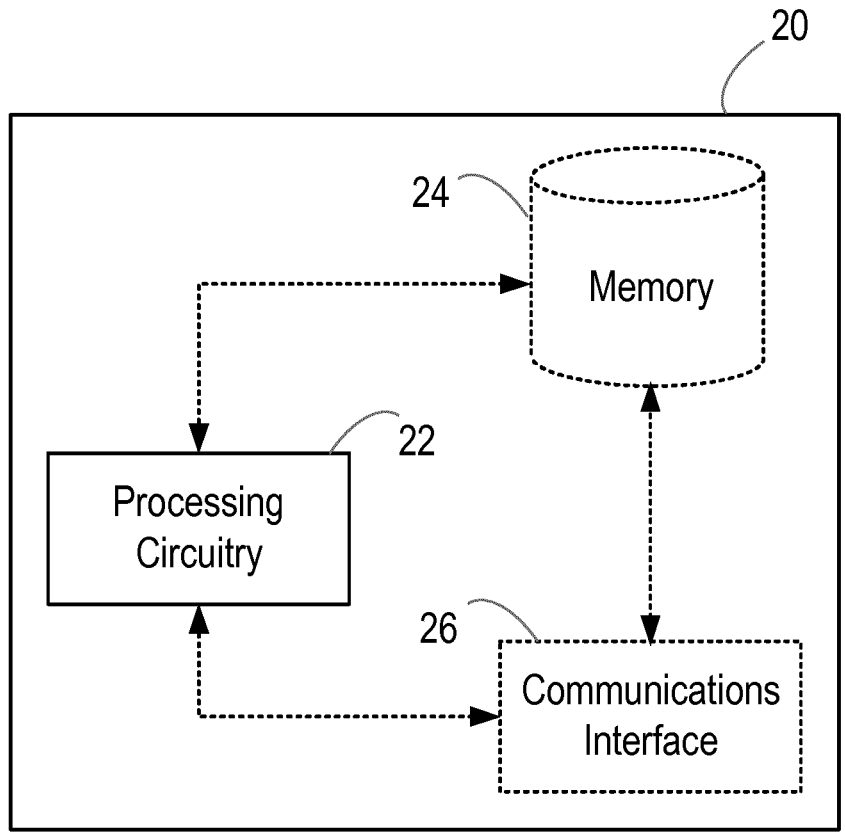
FIG. 3 is a block diagram illustrating a user equipment according to an embodiment.

FIG. 3 illustrates a first user equipment (UE) 20 of a network in accordance with an embodiment. Herein, references to a first user equipment 20 can include any device that may be used by an end user to communicate. Examples of a first user equipment 20 include, but are not limited to, a mobile device (e.g. a mobile phone, a smartphone, a smartwatch, a tablet, a laptop, or any other mobile device), a personal computer, or any other first user equipment. The first user equipment 20 may be a subscriber served by the network. In some embodiments, the first user equipment 20 may be a host for a user agent (UA).

As illustrated in FIG. 3, the first user equipment 20 comprises processing circuitry (or logic) 22. The processing circuitry 22 controls the operation of the first user equipment 20 and can implement the method described herein in relation to the first user equipment 20. The processing circuitry 22 can comprise one or more processors, processing units, multi-core processors or modules that are configured or programmed to control the first user equipment 20 in the manner described herein. In particular implementations, the processing circuitry 22 can comprise a plurality of software and/or hardware modules that are each configured to perform, or are for performing, individual or multiple steps of the method described herein in relation to the first user equipment 20.

Briefly, the processing circuitry 22 of the first user equipment 20 is configured to receive an establishment request from an application server 10 for the establishment of a communication session between the first user equipment 20 and a second user equipment. As mentioned earlier, the establishment request comprises a script executable by the first user equipment 20. The processing circuitry 22 of the first user equipment 20 is also configured to execute the script. The execution of the script controls handling of the communication session at the first user equipment 20.

Although not illustrated in FIG. 3, in some embodiments, the first user equipment 20 may comprise a dedicated script execution engine. In these embodiments, the dedicated script execution engine may comprise the processing circuitry 22. The script execution engine may be a service logic execution environment.

As illustrated in FIG. 3, the first user equipment 20 may optionally comprise a memory 24. The memory 24 of the first user equipment 20 can comprise a volatile memory or a non-volatile memory. In some embodiments, the memory 24 of the first user equipment 20 may comprise a non-transitory media. Examples of the memory 24 of the first user equipment 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the first user equipment 20 can be connected to the memory 24 of the first user equipment 20. In some embodiments, the memory 24 of the first user equipment 20 may be configured to store program code or instructions that can be executed by the processing circuitry 22 of the first user equipment 20 to perform the method described herein in relation to the first user equipment 20. Alternatively or in addition, the memory 24 of the first user equipment 20 can be configured to store any requests, responses, indications, information, data, notifications, signals, or similar, that are described herein. The processing circuitry 22 of the first user equipment 20 may be configured to control the memory 24 of the first user equipment 20 to store any requests, responses, indications, information, data, notifications, signals, or similar, that are described herein. In some embodiments, for example, the processing circuitry 22 of the first user equipment 20 may be configured to control the memory 24 of the first user equipment 20 to store any one or more of the establishment request received from the application server 10 and the script that the establishment request comprises (and/or a unique identifier for the script).

In some embodiments, as illustrated in FIG. 3, the first user equipment 20 may optionally comprise a communications interface 26. The communications interface 26 of the first user equipment 20 can be connected to the processing circuitry 22 of the first user equipment 20 and/or the memory 24 of the first user equipment 20. The communications interface 26 of the first user equipment 20 may be operable to communicate with other nodes of the network (such as the nodes of the network that will be described later, or any other nodes of the network, or any combination of other nodes of the network). For example, the communications interface 26 of the first user equipment 20 can be configured to transmit to and/or receive from other nodes requests, responses, indications, information, data, notifications, signals, or similar, that are described herein. In some embodiments, the communications interface 26 of the first user equipment 20 may be configured to receive a user input associated with the handling of the communication session. The processing circuitry 22 of the first user equipment 20 may be configured to control the communications interface 26 of the first user equipment 20 to transmit to and/or receive from other nodes requests, responses, indications, information, data, notifications, signals, or similar, that are described herein.

Although not illustrated in FIG. 3, in some embodiments, the first user equipment 20 may comprise a user interface, such as any one or more of a graphical user interface (GUI), a speaker, an earpiece, or any other user interface or any combination of user interfaces. The user interface of the first user equipment 20 may be configured to receive a user input (e.g. the earlier mentioned user input associated with the handling of the communication session) and/or render media.

It will be appreciated that FIG. 3 only shows the components required to illustrate an embodiment of the first user equipment 20 and, in a practical implementation, the first user equipment 20 may comprise additional or alternative components to those shown.

Figure 4:
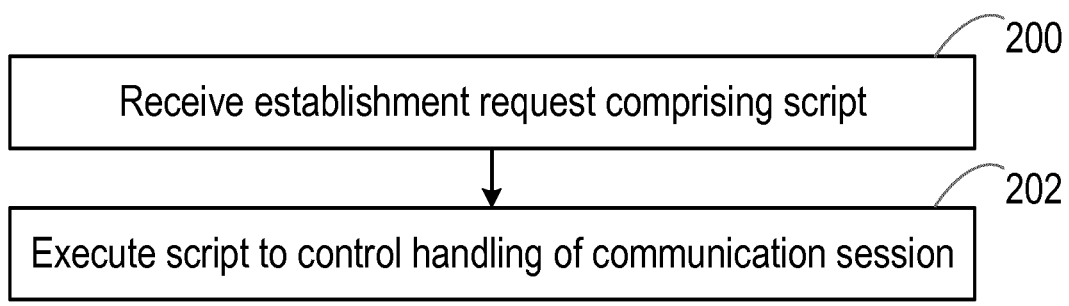
FIG. 4 is a block diagram illustrating a method of operating a user equipment according to an embodiment.

FIG. 4 is a flowchart illustrating a method of operating the first user equipment 20 of the network for controlling handling of a communication session in accordance with an embodiment. The method of FIG. 4 can be performed by or under the control of the processing circuitry 22 of the first user equipment 20.

With reference to FIG. 4, at block 200, an establishment request is received from an application server 10 for the establishment of a communication session between the first user equipment 20 and the second user equipment. More specifically, the processing circuitry 22 of the first user equipment 20 receives the establishment request (e.g. via the communications interface 26 of the first user equipment 20). In some embodiments, the establishment request may be received from an application programming interface (API) of the application server 10.

As mentioned earlier, the establishment request comprises a script executable by the first user equipment. The establishment request may be received using a session initiation protocol (SIP), a hypertext transfer protocol (HTTP), and/or any other suitable protocol. Thus, in some embodiments, the establishment request referred to herein may comprise a session initiation protocol (SIP) session establishment request and the communication session may comprise a SIP communication session. Alternatively or in addition, in some embodiments, the establishment request referred to herein may comprise a hypertext transfer protocol (HTTP) session establishment request and the communication session may comprise a HTTP communication session. In this way, as SIP is used for the establishment and control of multimedia communication sessions, the idea described herein can be used for script-driven multimedia communication session establishment. On the other hand, as HTTP is predominantly used as a control plane protocol for hypertext-based communication sessions, the idea described herein can be used for script-driven hypertext-based communication sessions. In some embodiments, a SIP based communication session may be augmented with an HTTP based communication session. Hence, in some embodiments, the inclusion of a script in an HTTP session establishment request can extend the idea described herein to multimedia communication sessions that are either initiated through SIP or initiated through HTTP. As mentioned earlier, in some embodiments, the establishment request may be a multipart (or multibody) establishment request. That is, the establishment request may comprise multiple parts (or multiple bodies) according to some embodiments. For example, in some embodiments, the establishment request may comprise a session description protocol (SDP) in addition to the script.

At block 202 of FIG. 4, the script is executed. More specifically, the processing circuitry 22 of the first user equipment 20 executes the script. The first user equipment 20 can thus support the script. In particular, the first user equipment 20 has the capability to receive and execute the script. The execution of the script controls handling of the communication session at the first user equipment 20. As mentioned earlier, in some embodiments, the script may comprise a set of instructions to control handling of a communication session between the first user equipment 20 and the second user equipment.

In some embodiments, upon receipt of the establishment request, the script may be directly or automatically executed to control handling of the communication session at the first user equipment 20. For example, the script can be an auto-execution script according to some embodiments. In some embodiments, prior to executing the script, it may be determined that the establishment request is a multipart (or multibody) establishment request. For example, in some embodiments, boundaries between multiple parts (or multiple bodies) may be identified in the establishment request to determine that the establishment request is a multipart (or multibody) establishment request.

In some embodiments, the execution of the script at the first user equipment controls handling of the communication session by controlling the first user equipment 20 to accept the establishment of the communication session (e.g. call acceptance), end or terminate the communication session (e.g. call termination) at a predefined time, and/or render (e.g. playout) media at a user interface of the first user equipment 20. Although some examples have been provided for the manner in which the execution of the script at the first user equipment 20 can control handling of the communication session, it will be understood that the handling of the communication session may be controlled in any other way and in any combination of ways.

Although not illustrated in FIG. 4, in some embodiments, the method may comprise transmitting, to the application server 10, an indication of one or more (e.g. mandatory) capabilities of the first user equipment 20. Thus, in some embodiments, the processing circuitry 22 of the first user equipment 20 can be configured to transmit, to the application server 10 (e.g. via the communications interface 26 of the first user equipment 20), an indication of one or more capabilities of the first user equipment 20. In some of these embodiments, the script executable by the first user equipment 20 may be generated based (or adapted in accordance with) on the one or more capabilities of the first user equipment 20. In some embodiments, the indication of the one or more capabilities of the first user equipment 20 may be in the form of a profile for the first user equipment 20. There may be different versions of the profile, such as "Version 1.0" (and subsequently "Version 2.0", etc.).

In some embodiments, the method may comprise transmitting, to the application server 10, a registration request (or an invite request, e.g. a SIP invite request, a HTTP invite request, and/or similar) for the first user equipment 20 to register with the application server 10. Thus, according to some embodiments, the processing circuitry 22 of the first user equipment 20 can be configured to transmit, to the application server 10 (e.g. via the communications interface 26 of the first user equipment 20), a registration request for the first user equipment 20 to register with the application server 10. In some of these embodiments, the registration request can comprise the indication of the one or more capabilities of the first user equipment 20.

As mentioned earlier, in some embodiments, the first user equipment 20 may be configured to support one or more (e.g. optional) capabilities associated with a communication session, which do not need to be communicated to the application server 10. In some embodiments, the script received by the first user equipment 20 from the application server 10 may include instructions corresponding to one or more capabilities associated with a communication session, such as any of those mentioned earlier. If any of the one or more of the capabilities associated with the communication session are not supported by the first user equipment 20, the script processing at the first user equipment 20 is not affected and can continue without executing the unsupported capabilities.

Although not illustrated in FIG. 4, in some embodiments, the execution of the script at the first user equipment 20 may comprise end-user interaction. For example, the script may allow for user interaction, such as at any moment. In particular, the method may comprise receiving a user input associated with the handling of the communication session. Thus, in some embodiments, the processing circuitry 22 of the first user equipment 20 can be configured to receive (e.g. via the communications interface 26 of the first user equipment 20) a user input associated with the handling of the communication session. As mentioned earlier, the application server 10 (or the API of the application server 10) may include the capability for user interaction with the communication session.

The user input may provide the usual call handling. In some embodiments, the user input associated with the handling of the communication session may comprise an instruction to terminate the communication session (e.g. terminating a call), an instruction to render media for the communication session (e.g. at a user interface of the first user equipment 20 in the manner described earlier), or any other user input or combination of user inputs associated with the handling of the communication session. In some embodiments, the user input may comprise user consent for certain actions. For example, the user may be offered to assert control over the communication session, e.g. to release the communication session at any moment.

In some embodiments, when the communication session has terminated, the script may be discarded by the first user equipment. For example, the script may only be intended for execution for the current communication session in some embodiments. Alternatively, in other embodiments, the script may be retained by the first user equipment 20 and optionally executed again for a subsequent communication session. In some embodiments, the method may comprise caching the script in a cache of scripts (e.g. stored in the memory 24 of the first user equipment 20). Thus, in some embodiments, the processing circuitry 22 of the first user equipment 20 can be configured to cache the script in the cache of scripts. In this way, the transfer of scripts can be optimized.

In some of these embodiments, each script may be cached with a unique identifier. For example, in some embodiments, the establishment request received by the first user equipment 20, which comprises the script, may also comprise a unique identifier for the script (e.g. in a header of the script). In these embodiments, the processing circuitry 22 of the first user equipment 20 may be configured to extract the unique identifier to cache the unique identifier with the script. The unique identifier cached with a script can be any identifier that uniquely identifies the script, e.g. a global object identifier. In this way, it is possible for the processing circuitry 22 of the first user equipment 20 to identify the cached scripts.

In some embodiments, the processing circuitry 22 of the first user equipment 20 may be configured to transmit to the application server 10 (e.g. during the communication session) an indication of the scripts that are cached at the first user equipment 20. In these embodiments, the processing circuitry 12 of the application server 10 may be configured to keep a record of the scripts cached at the first user equipment 20 (e.g. by storing the record in the memory 14 of the application server 10 for the first user equipment 20). The record may, for example, comprise the unique identifiers for the scripts cached at the first user equipment 20. In this way, once a script has been cached at the first user equipment 20, the application server 10 may transmit an establishment request comprising the unique identifier for the script to be executed for other, e.g. subsequent, communication sessions (rather than the script itself). In some of these embodiments, the establishment request may also comprise one or more parameters associated with the script. The one or more parameters associated with the script may be used by the first user equipment 20 to steer the script execution.

In some embodiments, the script may have an associated validity period. The validity period is a period after which the script expires. In some of these embodiments, the method may comprise purging the script from the cache on expiry of the associated validity period. Thus, in some embodiments, the processing circuitry 22 of the first user equipment 20 can be configured to purge the script from the cache on expiry of the associated validity period. In embodiments where the processing circuitry 12 of the application server 10 keeps a record of the scripts cached at the first user equipment 20, the processing circuitry 12 of the application server 10 may likewise remove the record of (e.g. the unique identifier for) that script for the first user equipment 20 (e.g. by deleting the record of that script from the memory 14 of the application server 10 for the first user equipment 20). The script itself may still be stored at the application server 10 (e.g. in the memory 14 of the application server 10).

Figure 5:
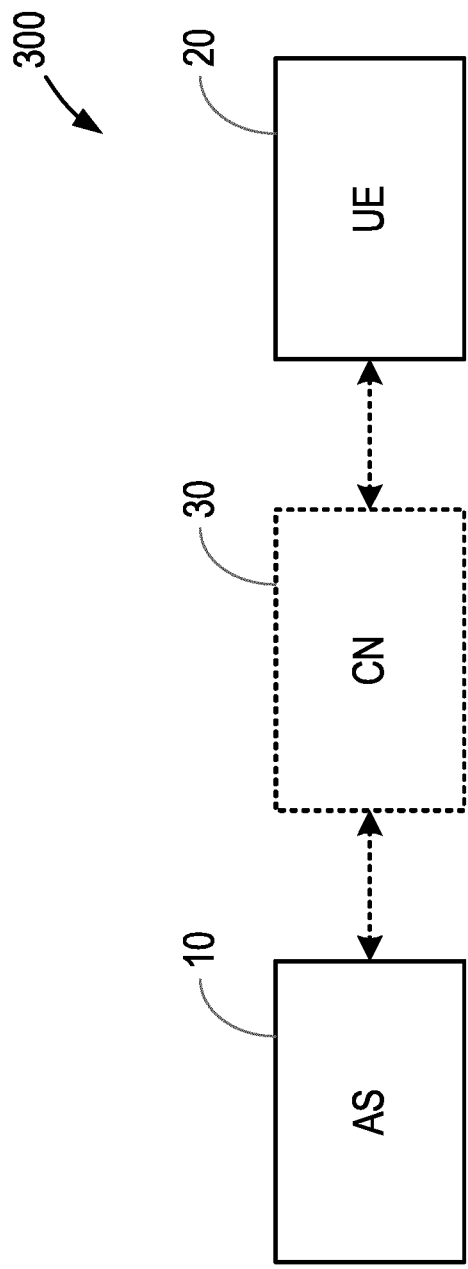
FIG. 5 is a block diagram illustrating a network according to an embodiment.

FIG. 5 illustrates a network 300 in accordance with an embodiment. The network 300 can be a 3G network, a 4G network, a 5G network, or any other generation network. In some embodiments, the network 300 can be a network of an IP multimedia subsystem (IMS). Thus, the network 300 may be an IMS network according to some embodiments.

The network 300 can comprise any one or more of an application server (AS) 10 and a first user equipment (UE) 20. That is, the network 300 can comprise one or more application servers 10, one or more first user equipments 20, or one or more application servers 10 and one or more first user equipments 20. The one or more application servers 10 of the network 300 are as described earlier with reference to FIGS. 1 and 2. The one or more first user equipments 20 of the network 300 are as described earlier with reference to FIGS. 3 and 4. For simplicity, the network 300 of FIG. 5 is illustrated as comprising a single application server 10 and a single first user equipment 20. However, it will be understood that the network 300 may comprise any other number of application servers 10 and/or any other number of first user equipments 20 according to other embodiments. Although not illustrated in FIG. 5, the network 300 can also comprise one or more second user equipments. The one or more second user equipments may be configured in the same way as the first user equipment described earlier with reference to FIGS. 3 and 4 according to some embodiments.

As illustrated in FIG. 5, an application server 10 of the network 300 can communicate with (and thus transmit the establishment request to) a first user equipment 20 of the network 300. For example, as illustrated in FIG. 5, in some embodiments, an application server 10 of the network 300 may be configured to communicate with a first user equipment 20 of the network 300 via one or more interfaces of the network 300 and/or via a core network (CN) 30, e.g. one or more nodes of the core network 30.

Figure 6:
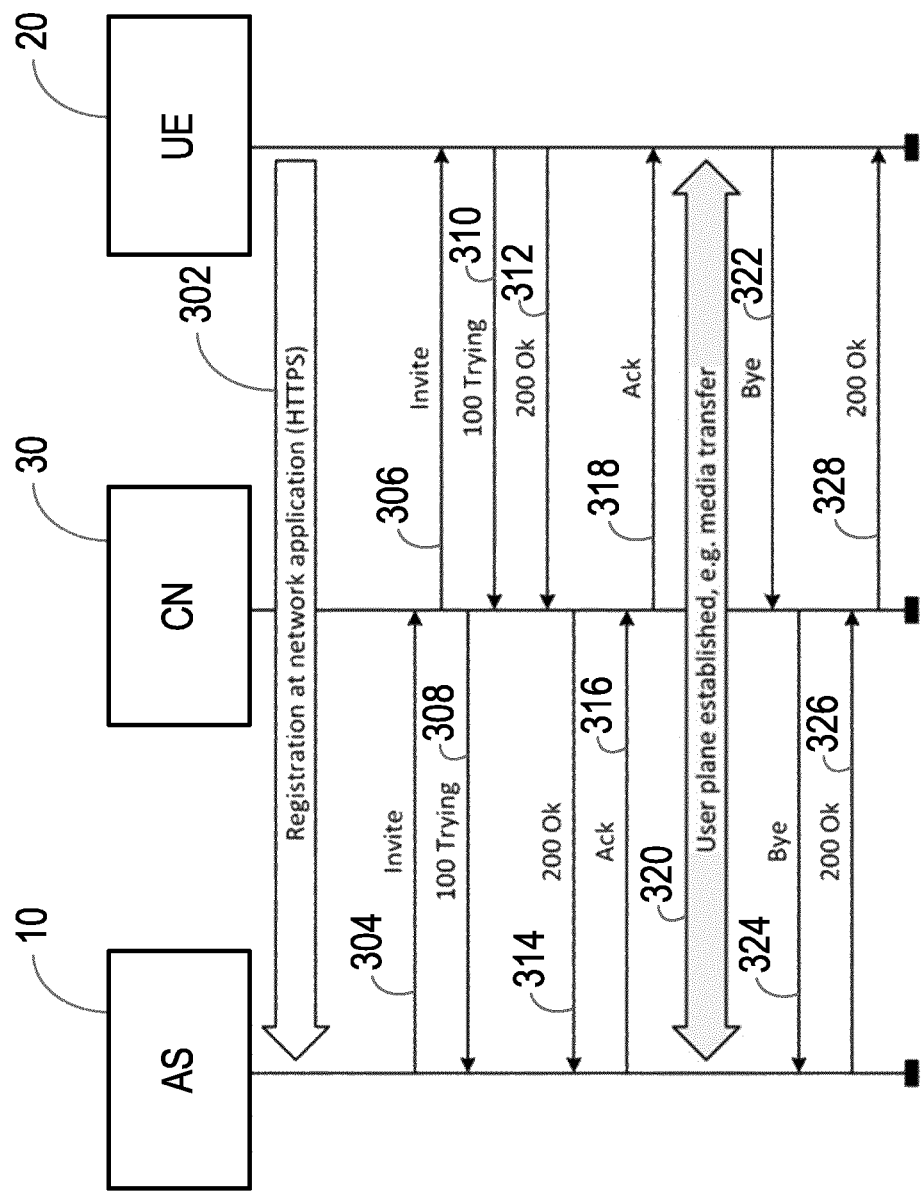
FIG. 6 is a signalling diagram illustrating the signals in a network according to an embodiment.

FIG. 6 is a signalling diagram illustrating the signals in a network 300 in accordance with an embodiment. The network 300 is as described earlier with reference to FIG. 5 and the network 300 comprises the application server (AS) 10 and the first user equipment (UE) 20 described earlier with reference to FIGS. 1, 2, 3 and 4. The network 300 in accordance with this embodiment comprises a core network (CN) 30, which may itself comprise one or more nodes. The operation of the network 300 according to the embodiment will now be described with reference to FIGS. 5 and 6.

In some embodiments, the first UE 20 may transmit a registration request 302 to the AS 10, e.g. via the CN or one or more nodes of the CN 30. The registration request 302 may be transmitted using a session initiation protocol (SIP), a hypertext transfer protocol (HTTP), and/or any other suitable protocol. The registration request 302 is a request for the first UE 20 to register with the AS 10. The registration request 302 is received by the AS 10, e.g. via the CN or one or more nodes of the CN 30. The first UE 20 can thus register with the application server 10. As described earlier, in some embodiments, an indication of one or more capabilities of the first user equipment 20 may be transmitted from the first user equipment 20 and received by the application server 10. In some embodiments, for example, the registration request 302 can comprise the indication of the one or more capabilities of the first user equipment 20.

Although not illustrated in FIG. 6, the AS 10 generates a script executable by the first UE 20 in the manner described earlier (block 100 of FIG. 2), where execution of the script at the first UE 20 controls handling of a communication session between the first UE 20 and a second UE. The AS 10 transmits an establishment request 304, 306 (or an invite, e.g. a SIP invite, a HTTP invite, and/or similar) to the first UE 20 for the establishment of the communication session between the first UE 20 and the second UE (block 102 of FIG. 2). As described earlier, the establishment request 304, 306 comprises the script for execution at the first user equipment 20. For example, in some embodiments, the script can be included in (e.g. embedded in) the establishment request for execution at the first UE 20. In some embodiments, the script may be included in (e.g. embedded in) the body of the establishment request.

The AS 10 may transmit the establishment request 304, 306 directly to the first UE 20 or indirectly to the first UE 20. For example, in some indirect embodiments such as that illustrated in FIG. 6, the AS 10 may transmit the establishment request 304, 306 to the first UE 20 via the CN 30 (or one or more nodes of the CN 30). Thus, according to some embodiments such as that illustrated in FIG. 6, the AS 10 may transmit the establishment request 304 to the CN 30 (or one or more nodes of the CN 30) and the CN 30 (or the one or more nodes of the CN 30) may then transmit the establishment request 306 to the first UE 20.

The first UE 20 receives the establishment request 304, 306 comprising the script from the AS 10 for the establishment of the communication session between the first UE 20 and the second UE (block 200 of FIG. 4). The first UE 20 may then process the establishment request. For example, as illustrated in FIG. 6, in some embodiments, the first UE 20 may transmit a "100 Trying" provisional response 308, 310 to the AS 10. The first UE 20 may transmit the provisional response 308, 310 directly to the AS 10 or indirectly to the AS 10. For example, in some indirect embodiments such as that illustrated in FIG. 6, the first UE 20 may transmit the provisional response 308, 310 to the AS 10 via the CN 30 (or one or more nodes of the CN 30). Thus, according to some embodiments such as that illustrated in FIG. 6, the first UE 20 may transmit the provisional response 310 to the CN 30 (or one or more nodes of the CN 30) and the CN 30 (or the one or more nodes of the CN 30) may then transmit the provisional response 308 to the AS 10.

In some embodiments, the processing of the establishment request 304, 306 may comprise the handling of precondition signalling by the AS 10. In particular, the AS 10 may perform a preconditioning process on the establishment request 304, 306. When the preconditioning process is complete, the AS 10 may offer the communication session (e.g. a call) to the first UE 20. Thus, the process may enter the alerting phase where the first UE 20 is alerted to the communication session.

As mentioned earlier, the establishment request comprises a script executable by the first UE 20. When the first UE 20 has received the establishment request 304, 306 and has transmitted the provisional response 308, 310 to the AS 10, the first UE 20 may determine that the establishment request 304, 306 is a multipart establishment request. For example, the first UE 20 may determine that the establishment request 304, 306 comprises the script in addition to, for example, a session description protocol (SDP) offer. In some embodiments, the AS 10 may, so long as the first UE 20 is registered with the AS 10, establish the communication session between the first UE 20 and the second UE, with the script. The first UE 20 can, e.g. upon receiving the establishment request 304, 306, retrieve the script from that establishment request 304, 306 and start executing that script.

The first UE 20 executes the script in the manner described earlier (block 202 of FIG. 4). For example, in some embodiments, the first UE 20 may executed the script via a service logic execution platform. In some embodiments, the script may be executed by the first UE 20 upon receiving the establishment request 304, 306 (and optionally after transmission of the "100 Trying" provisional response 308, 310 by the first UE 20 to the AS 10). As mentioned earlier, in some embodiments, upon receipt of the establishment request, the script may be directly or automatically executed to control handling of the communication session at the first user equipment 20. As also mentioned earlier, in some embodiments, the first UE 20 may comprise a dedicated script execution engine. In these embodiments, the dedicated script execution engine may comprise the processing circuitry 22. Thus, in some embodiments, the script may be executed on the dedicated script execution engine of the first UE 20. In this way, the first UE 20 uses the script for the handling of the communication session. In some embodiments, as described earlier, the execution of the script at the first user equipment 20 may comprise end-user interaction.

In the embodiment illustrated in FIG. 6, the execution of the script has the effect that the first UE 20 accepts the communication session. As illustrated in FIG. 6, the first UE 20 may signal acceptance of the communication session to the AS 10 by transmitting an acceptance message 312, 314 (e.g. a "200 Ok" acceptance message) to the AS 10. The first UE 20 may transmit the acceptance message 312, 314 directly to the AS 10 or indirectly to the AS 10. For example, in some indirect embodiments such as that illustrated in FIG. 6, the first UE 20 may transmit the acceptance message 312, 314 to the AS 10 via the CN 30 (or one or more nodes of the CN 30). Thus, according to some embodiments such as that illustrated in FIG. 6, the first UE 20 may transmit the acceptance message 312 to the CN 30 (or one or more nodes of the CN 30) and the CN 30 (or the one or more nodes of the CN 30) may then transmit the acceptance message 314 to the AS 10.

As illustrated in FIG. 6, the AS 10 may signal acknowledgment of the acceptance by transmitting an acknowledgment message 316, 318 (e.g. an "Ack" message) to the first UE 20. The AS 10 may transmit the acknowledgment message 316, 318 directly to the first UE 20 or indirectly to the first UE 20. For example, in some indirect embodiments such as that illustrated in FIG. 6, the AS 10 may transmit the acknowledgment message 316, 318 to the first UE 20 via the CN 30 (or one or more nodes of the CN 30). Thus, according to some embodiments such as that illustrated in FIG. 6, the AS 10 may transmit the acknowledgment message 316 to the CN 30 (or one or more nodes of the CN 30) and the CN 30 (or the one or more nodes of the CN 30) may then transmit the acknowledgment message 318 to the first UE 20. A user plane 320 is then established. The user plane 320 may, for example, be a media transfer session (e.g. the streaming of voice/video).

As illustrated in FIG. 6, in some embodiments, the first UE 20 may transmit an end signal ("Bye") 322, 324 to the AS 10 to end the communication session. The first UE 20 may transmit the end signal 322, 324 directly to the AS 10 or indirectly to the AS 10. For example, in some indirect embodiments such as that illustrated in FIG. 6, the first UE 20 may transmit the signal 322, 324 to the AS 10 via the CN 30 (or one or more nodes of the CN 30). Thus, according to some embodiments such as that illustrated in FIG. 6, the first UE 20 may transmit the signal 322 to the CN 30 (or one or more nodes of the CN 30) and the CN 30 (or the one or more nodes of the CN 30) may then transmit the signal 324 to the AS 10.

As illustrated in FIG. 6, in some embodiments, the AS 10 may signal acceptance of the end signal by transmitting an acceptance message 326, 328 (e.g. a "200 Ok" acceptance message) to the first UE 20. The AS 10 may transmit the acceptance message 326, 328 directly to the first UE 20 or indirectly to the first UE 20. For example, in some indirect embodiments such as that illustrated in FIG. 6, the AS 10 may transmit the acceptance message 326, 328 to the first UE 20 via the CN 30 (or one or more nodes of the CN 30). Thus, according to some embodiments such as that illustrated in FIG. 6, the AS 10 may transmit the acceptance message 326 to the CN 30 (or one or more nodes of the CN 30) and the CN 30 (or the one or more nodes of the CN 30) may then transmit the acceptance message 328 to the first UE 20.

Figure 7:
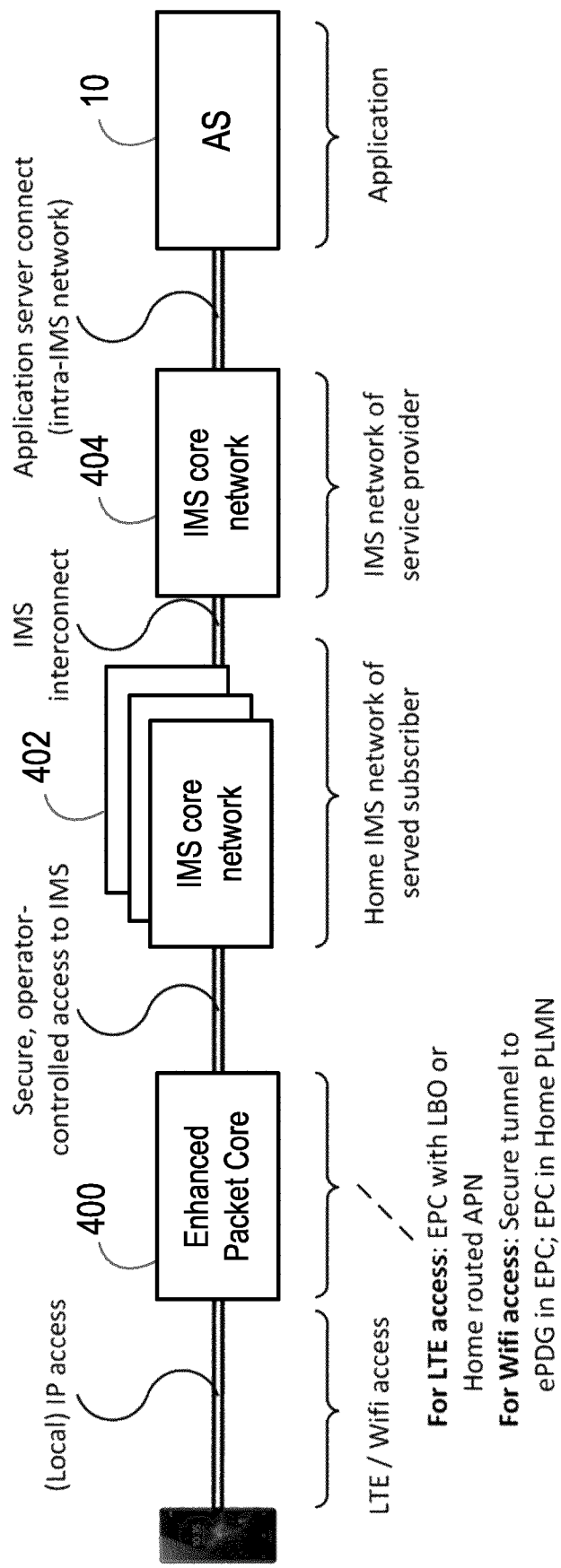
FIG. 7 is a block diagram illustrating a network according to an embodiment.

FIG. 7 illustrates a network in accordance with an embodiment. In particular, the network of this illustrated example embodiments is a network of an IP multimedia subsystem (IMS). In more detail, FIG. 7 illustrates an environment in which a communication session may be established towards a first user equipment (UE) 20, which is not itself illustrated in FIG. 7. FIG. 7 illustrates the control plane only.

The network illustrated in FIG. 7 comprises the application server (AS) 10 described earlier with reference to FIGS.

1 and 2. The network illustrated in FIG. 7 also comprises an enhanced packet core 400 (EPC), an IMS core network 402 of the first UE 20 (which may also be referred to as a home IMS network of the first UE 20) and an IMS core network 404 of the AS 10 (e.g. of a service provider). The first UE 20 can be attached to the EPC 400 through long term evolution (LTE) or through Wi-Fi. For LTE access, the packet data network gateway (PDN-Gw) may be in the visited public land mobile network (PLMN), i.e. local breakout (LBO), or in the home PLMN, i.e. S8-HR. The first UE 20 is registered with its home IMS network 402.

The AS 10 may be contained in a designated IMS network or may be functionally connected to a designated IMS network. In either case, an application in respect of which the communication session is established may be provided through a designated IMS network according to some embodiments. This designated IMS network can have general IMS interconnect to other IMS networks (e.g. of other operators), as normal.

Figure 8:
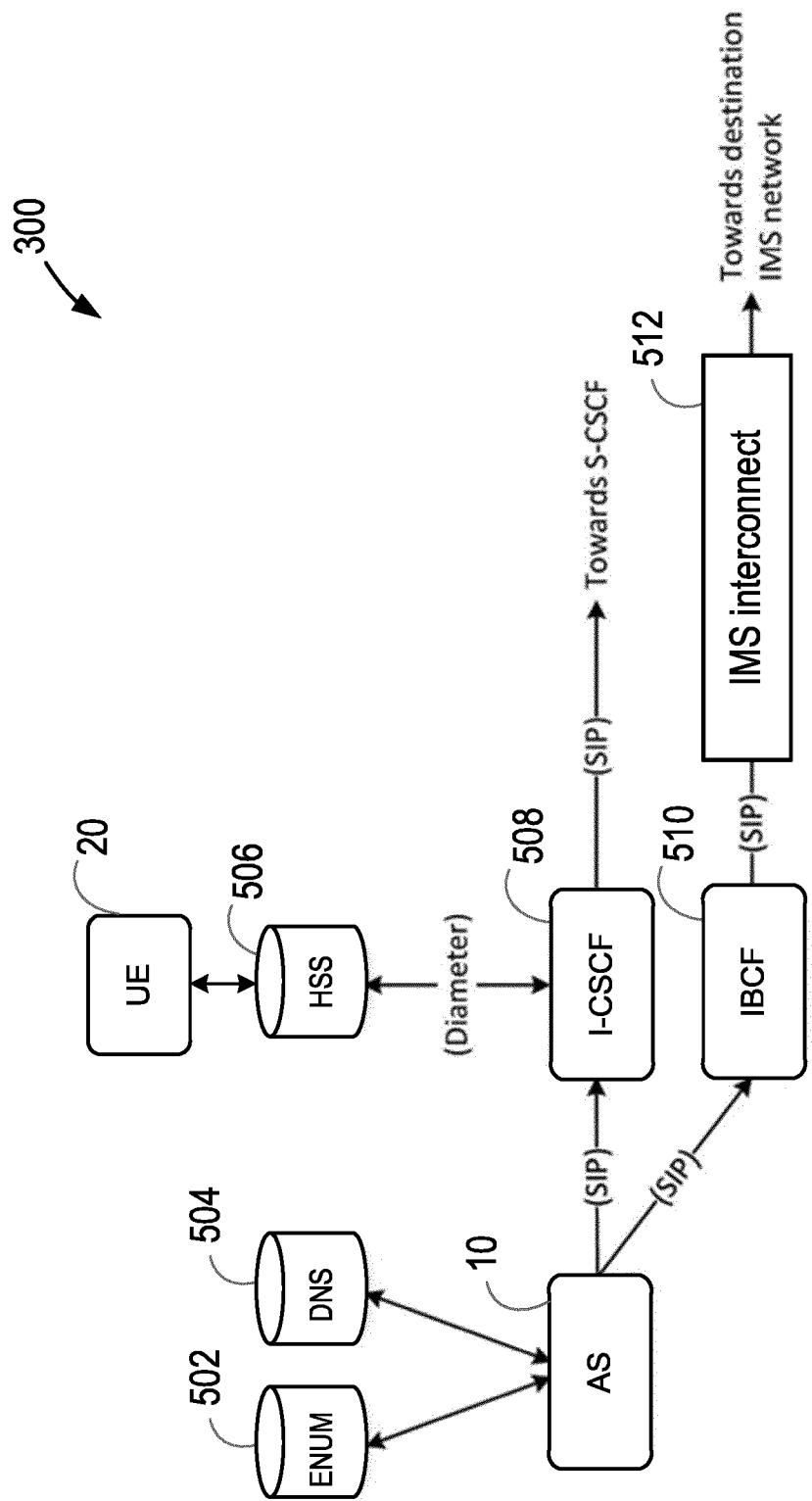
FIG. 8 is a block diagram illustrating a network according to an embodiment.

FIG. 8 illustrates a network 300 in accordance with an embodiment. The basic architecture of the network 300 is as described earlier with respect to FIG. 5 in that the network comprises an application server (AS) 10, a first user equipment (UE) 20 and optionally also a core network (CN) 30. The network 300 may also comprise a second user equipment (not illustrated). In more detail, FIG. 8 illustrates an example architecture for communication session establishment by the AS 10. The network 300 illustrated in FIG. 8 uses a session initiation protocol (SIP) for communications. However, it will be understood that any other protocol or any combination of protocols may be used.

In general, the public identity for the establishment of the communication session towards the first UE 20 can be assumed to be the phone number (e.g. the E.164 number) of the first UE 20 according to some embodiments. In some embodiments, the application server 10 may submit an electronic number mapping query to an electronic number mapping system (ENUM) 502 to obtain a uniform resource identifier (URI) associated with the phone number (e.g. the E.164 number). This URI can be used by the AS 10 in the establishment of a communication session towards the first UE 20. In the example embodiment of FIG. 8, the communication session is a SIP communication session. It is expected that operators have ENUM-interconnect, as part of IMS interconnect. That is, an operator of one public land mobile network (PLMN) can obtain, through ENUM query, a URI of a phone number (e.g. the E.164 number) that is being served, for IMS services, by another operator. In some embodiments, the AS 10 may operate based on the outcome of ENUM query.

For example, in some embodiments, when the domain of the URI obtained from ENUM is a domain that is served by this IMS operator, the AS 10 may transmit the establishment request (or invite request) described earlier towards an interrogating call state control function (I-CSCF) 508. The I-CSCF 508 can be configured to, e.g. via a home subscriber server (HSS) 506, forward the establishment request towards a serving call session control function (S-CSCF) that is allocated to the first UE 20. In some embodiments where the domain of the URI obtained from ENUM is a domain served by one of the peer IMS operators, the AS 10 may transmit the establishment request towards an interconnect border control function (IBCF) 510. In some of these embodiments, the IBCF 510 may forward the registration request towards the IMS network serving the first UE 20, e.g. via an IMS interconnect 512. In some embodiments, one or both of the transmission of the establishment request towards the I-CSCF and the transmission of the establishment request towards the IBCF may involve the AS 10 submitting a domain name query to a domain name system (DNS) 504, for domain resolving.

Figure 9:
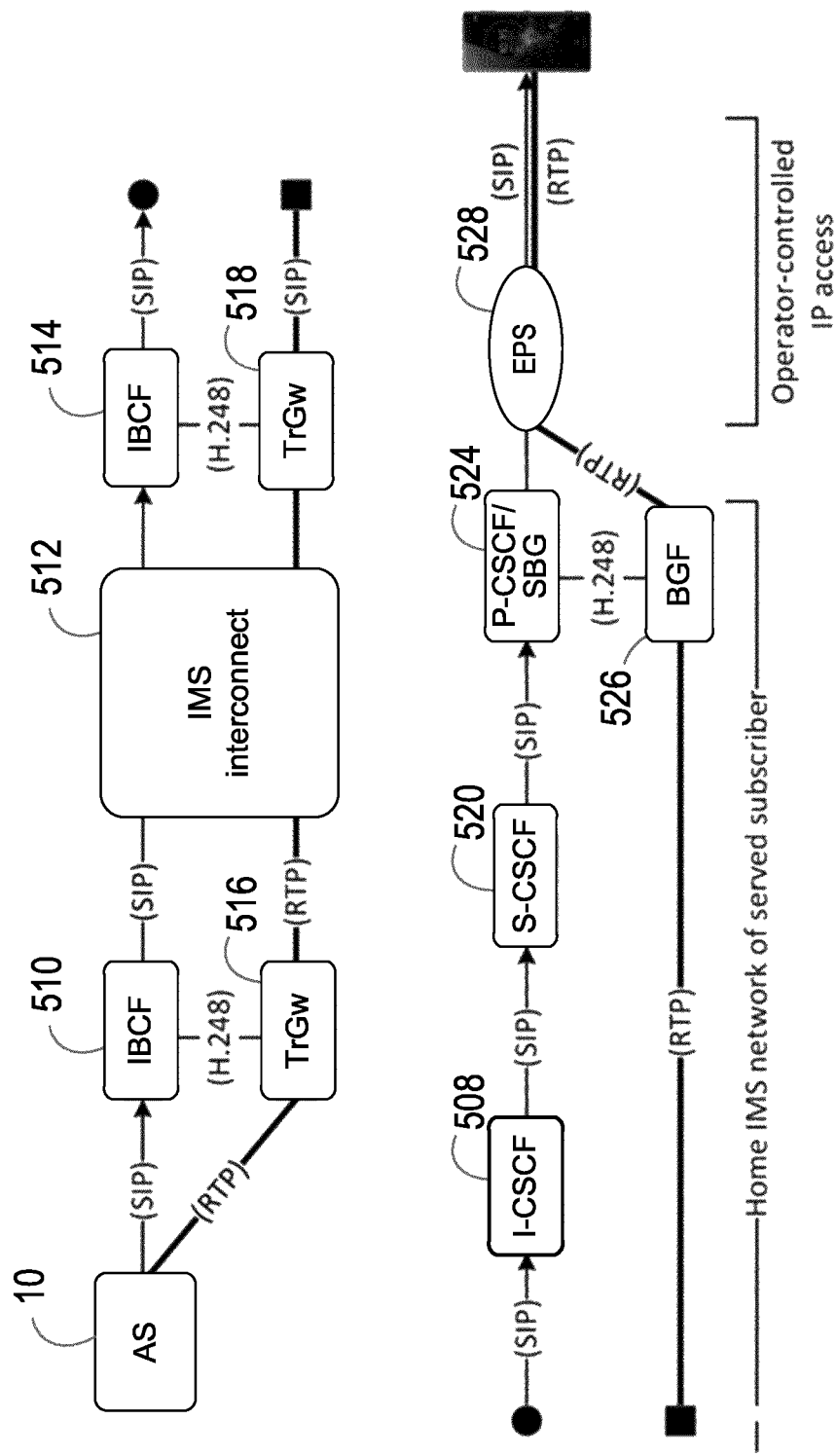
FIG. 9 is a block diagram illustrating a network according to an embodiment.

FIG. 9 illustrates a network in accordance with an embodiment. In more detail, FIG. 9 illustrates an example architecture for an end-to end communication session establishment by the application server (AS) 10, including user plane. The home subscriber server (HSS) is not shown. In some embodiments, the user plane, e.g. comprising a real-time transport protocol (RTP), may be established only when negotiated between the first user equipment (UE) 20 and the second UE.

As illustrated in FIG. 9, in some embodiments, there is an application-initiated communication session establishment. The AS 10 initiates a communication session between the first UE 20 (not illustrated in FIG. 9) and a second user equipment (also not illustrated in FIG. 9), whereby the communication session shall be subject to a script executable by the first UE 20. The AS 10 sends an establishment request, which in the example illustrated in FIG. 9 is a SIP Invite request, towards an Interconnect Border Control Function (IBCF) 510. The IBCF 510 seizes a user plane through-connection bridge in a Transition Gateway (TrGw) 516. The protocol between IBCF and TrGw is H.248, which is an ITU-T standard for media gateway control. The SIP Invite request that is sent from AS 10 to IBCF 510 is extended towards the IMS network of the first UE 20. This SIP Invite request is routed through IMS Interconnect 512 based on standard SIP routing principles for IMS.

The SIP Invite request is routed towards an IBCF 514 of the IMS network of the first UE 20. This IBCF 514 takes the role of inbound SIP server. The IBCF 514 seizes a through-connection bridge in a TrGw 518. This step of IBCF 514 is identical to the seizing of a through-connection bridge by IBCF 510. The IBCF 514 forwards the SIP Invite request towards an Interrogating Call Session Control Function (I-CSCF) 508. The I-CSCF 508 forwards the SIP Invite request towards the Serving Call Session Control Function (S-CSCF) 520 for the first UE 20. The I-CSCF 508 contacts a Home Subscriber System (HSS; not depicted in FIG. 9). The S-CSCF 520 forwards the SIP Invite request towards the contact address of the first UE 20. The SIP Invite request is sent through the Proxy Call Session Control Function (P-CSCF) 524 for the first UE 20. The P-CSCF 524 is commonly co-located with the Session Border Gateway (SBG). The SBG seizes a through-connection bridge in a Border Gateway Function (BGF) 526. The protocol between SBG 524 and BGF 526 is H.248.

The SIP Invite request is sent towards the first UE 20. The SIP signalling towards the first UE 20 as well as the user plane towards the first UE 20 is carried through the Enhanced Packet System (EPS) 528. The EPS is the functional combination of Enhanced Packet Core (EPC) and the Long Term Evolution (LTE; 4G) radio access network. Resulting from the transfer of the SIP Invite request from AS 10 towards the first UE 20, a multimedia communication session is established between the first UE 20 and the second UE through the AS 10. According to the idea described herein, the SIP Invite request comprises a script that is executed by the first UE 20 for handling this communication session.

When an establishment request comprising a script (or a unique identifier for a script) is transmitted from the AS 10 to the first UE 20, a serving call session control function (S-CSCF) 520 of the second UE can deduce from the presence of the script in the establishment request that the communication session may be subject to script-control. The S-CSCF 520 may, for that reason, indicate the presence of the script in a charging output (Diameter). In some embodiments, the presence of the script (or a unique identifier for a script) in the establishment request may not be a definitive indication that the communication session will in actual fact be subject to script-control. For example, in some embodiments, the script execution at the first UE 20 be de-activated. In order to mitigate this, the first UE 20 can, when it embarks on the actual script execution, indicate this in a response message, e.g. in a first 180 Ringing message, a first 183 Session Progress message, or a 200 Ok message. The S-CSCF 520 includes this indication in a charging output. The post-processing system then has an indication that the communication session was script-driven. For example, this indication may be used to waiver any charge for the communication session against the end-user but, instead, charge the service provider for the communication session.

In some embodiments, a proxy call session control function (P-CSCF) 524 and/or the S-CSCF 520 may indicate in a charging output the presence of a script (or a unique identifier for a script) in the establishment request and/or the actual execution of the script. This can increase trustworthiness. For example, in some embodiments, the presence of a script (or a unique identifier for a script) in the establishment request may be indicated by a designated attribute value pair (AVP) in a charging output, e.g. a Diameter online charging (Ro) output or Diameter offline charging (Rf) output. In some embodiments, this charging output may immediately follow a transaction request from the second UE to the application server 10 traversing the P-CSCF 524 and/or S-CSCF 520. Alternatively or in addition, in some embodiments, the actual execution of the script may be indicated by a designated AVP a charging output, e.g. a Diameter Ro/Rf output. In some embodiments, this charging output may be the first Diameter message following a transaction response containing such an indication. An operator policy may be that calls that are subject to control by a script are exempted from charging.

Figure 10:
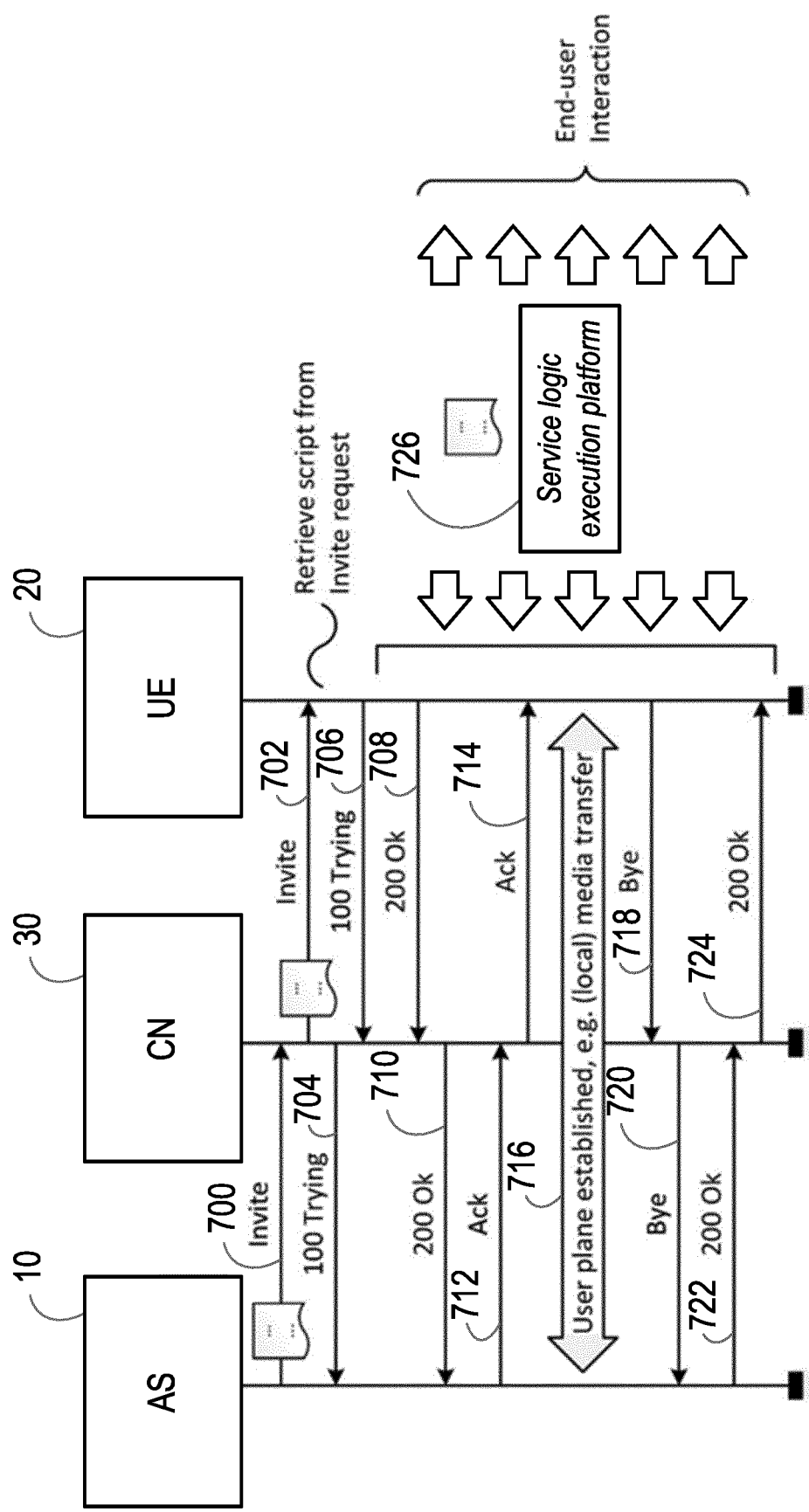
FIG. 10 is a signalling diagram illustrating the signals in a network according to an embodiment.

FIG. 10 is a signalling diagram illustrating the signals in a network 300 in accordance with an embodiment. The network 300 is as described earlier with reference to FIG. 5 and the network 300 comprises the application server (AS) 10 and the first user equipment (UE) 20 described earlier with reference to FIGS. 1, 2, 3 and 4. The network 300 in accordance with this embodiment comprises a core network (CN) 30, which may itself comprise one or more nodes. The operation of the network 300 according to the embodiment will now be described with reference to FIGS. 5 and 10.

Although not illustrated in FIG. 10, the AS 10 generates a script executable by the first UE 20 in the manner described earlier (block 100 of FIG. 2), where execution of the script at the first UE 20 controls handling of a communication session (e.g. a call) between the first UE 20 and the second UE. The signals 700 to 724 of FIG. 10 correspond to the signals 304 to 328 of FIG. 6 and the corresponding description with respect to FIG. 6 will be understood to also apply to FIG. 10.

As illustrated in FIG. 10, at block 726, the first UE 20 executes the script in the manner described earlier (block 202 of FIG. 4). For example, in some embodiments, the first UE 20 may executed the script via a service logic execution platform. In this way, the first UE 20 uses the script for the handling of the communication session. In some embodiments, as illustrated in FIG. 10 and as described earlier, the execution of the script at the first user equipment 20 may comprise end-user interaction.

Figure 11:
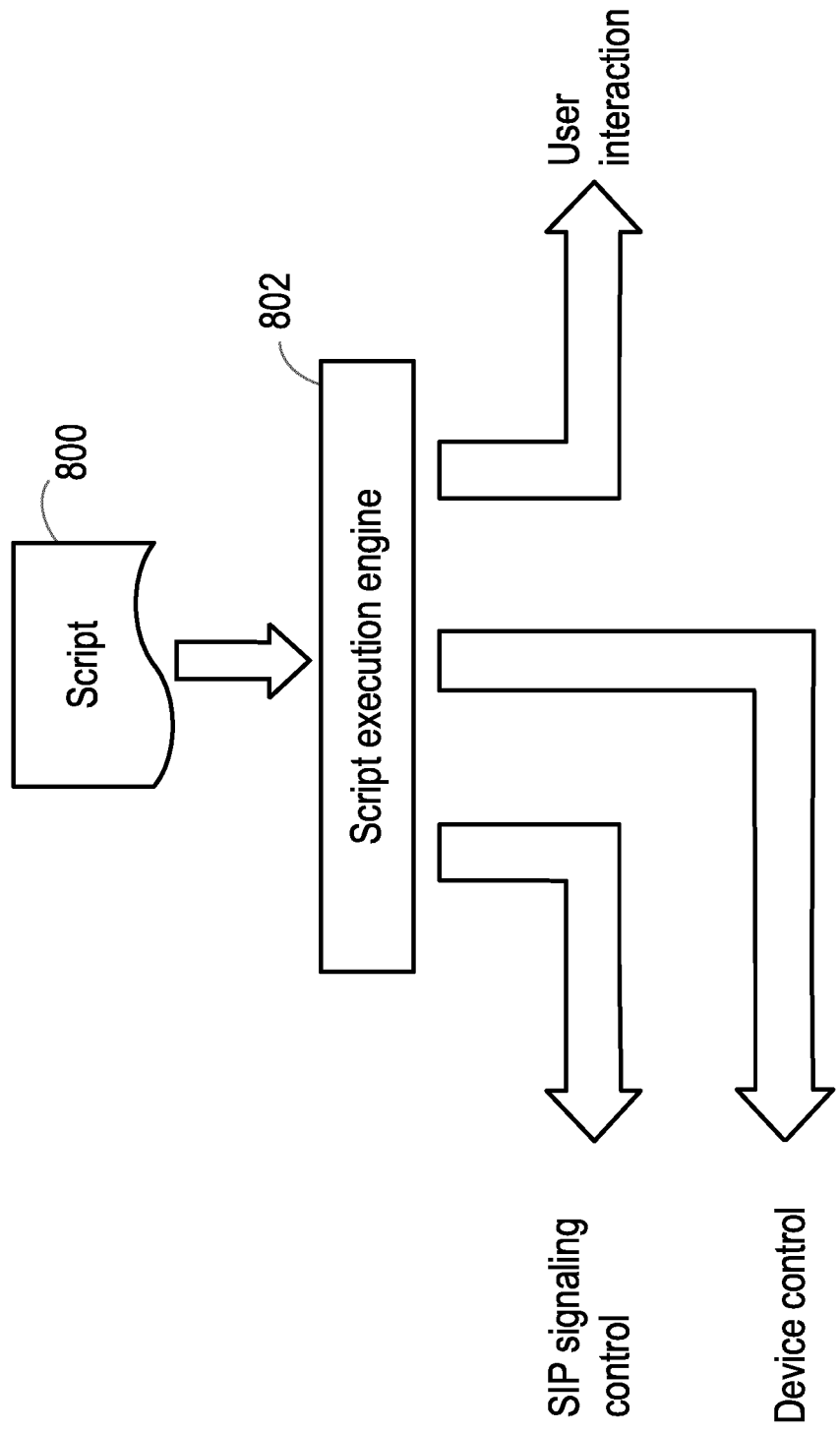
FIG. 11 is a block diagram illustrating a method in a network according to an embodiment.

FIG. 11 is an illustration of a method in a network in accordance with an embodiment. As illustrated in FIG. 11, a script 800 executable by a first user equipment 20 is generated by an application server 10 in the manner described earlier (block 100 of FIG. 2). As explained earlier, execution of the script 800 at the first user equipment 20 controls handling of a communication session between the first user equipment 20 and a second user equipment. An establishment request comprising the script 800 for execution at the first user equipment 20 is transmitted from the application server 10 to the first user equipment 20 for the establishment of the communication session between the first user equipment 20 and the second user equipment (block 102 of FIG. 2).

The establishment request comprising the script 800 is received by the first user equipment 20 from the application server 10 for the establishment of a communication session between the first user equipment 20 and the second user equipment (block 200 of FIG. 4). As mentioned earlier, in some embodiments, the first user equipment 20 may comprise a dedicated script execution engine 802. In these embodiments, the dedicated script execution engine 802 may comprise the processing circuitry 22 described earlier. The script execution engine may be a service logic execution environment. In some embodiments, the service logic may be executed through a designated set of application programming interfaces (API's) offered at the first user equipment 20. In the embodiment illustrated in FIG. 11, the script execution engine 802 receives the establishment request comprising the script 800. The script execution engine 802 executes the script 800 (block 202 of FIG. 4). In some embodiments, the script execution engine 802 may be (e.g. dynamically) loaded with the script. The execution of the script 800 controls handling of the communication session at the first user equipment 20 in the manner described earlier.

For example, as illustrated in FIG. 11, in some embodiments, the execution of the script 800 may use a designated capability offered by the script execution engine. This may, for example comprise, non-exhaustively, (i) "SIP signalling control", which can be the initiation of the sending of a SIP message, (ii) "device control", which can comprise interaction with internal equipment of the first UE 20 (such as a camera and/or screen of the first UE 20), and (iii) "user interaction", which can comprise applying interaction with the end-user of the first UE 20, such as accepting input through a touch screen and/or buttons of the first UE 20. The SIP signalling can be in accordance with the SIP standard and the IMS standard.

Figure 12:
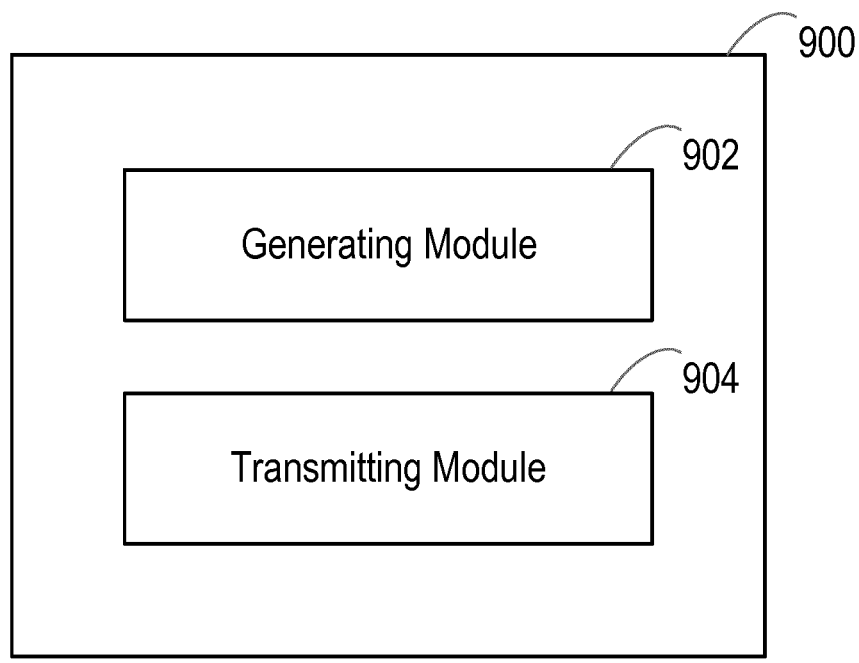
FIG. 12 is a block diagram illustrating an application server according to an embodiment.

FIG. 12 is a block diagram illustrating an application server 900 of a network in accordance with an embodiment. The application server 900 comprises a generating module 902 configured to generate a script executable by a first user equipment, where execution of the script at the first user equipment controls handling of the communication session between the first user equipment 20 and a second user equipment. The application server 900 comprises a transmitting module 904 configured to transmit an establishment request to the first user equipment for the establishment of the communication session between the first user equipment and the second user equipment. The establishment request comprises the script for execution at the first user equipment.

Figure 13:
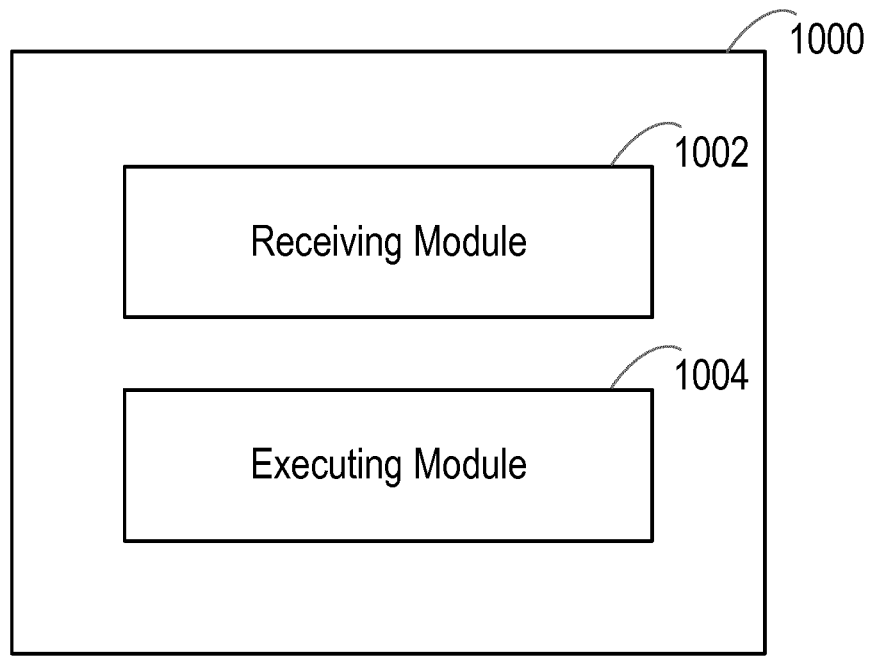
FIG. 13 is a block diagram illustrating a user equipment according to an embodiment.

FIG. 13 is a block diagram illustrating a first user equipment 1000 of a network in accordance with an embodiment. The first user equipment 1000 comprises a receiving module 1002 configured to receive an establishment request from an application server 900 for the establishment of a communication session between the first user equipment 1000 and a second user equipment. The establishment request comprises a script executable by the first user equipment 1000. The first user equipment 1000 comprises an executing module 1004 configured to execute the script. The execution of the script controls handling of the communication session at the first user equipment 1000.

The network functionality described herein can be performed by hardware. Thus, the network 300 described herein can be a hardware network. For example, the application server 10, 900 can be a hardware server, the first user equipment 20, 1000 can be a hardware user equipment, the second user equipment can be a hardware user equipment and/or any other nodes of the network 300 can be hardware nodes. However, it will also be understood that at least part or all of the network functionality described herein can be virtualized. For example, the functions performed within the network 300 (e.g. by any one or more of the application server 10, 900, the first user equipment 20, 1000, the second user equipment and other nodes) can be implemented in software running on generic hardware that is configured to orchestrate the network functionality. Thus, in some embodiments, the application server 10, 900 can be a virtual server, the first user equipment 20, 1000 can be a virtual user equipment, the second user equipment can be a virtual user equipment and/or any other nodes of the network 300 can be virtual nodes. In some embodiments, at least part or all of the network functionality described herein may be performed in a network enabled cloud.

It will be understood that at least some or all of the method steps described herein can be automated according to some embodiments. That is, in some embodiments, at least some or all of the method steps described herein can be performed automatically. As such, an automated method for controlling handling of communications sessions can be provided according to some embodiments.

There is also provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Therefore, in the manner described herein, there is advantageously provided an improved technique for controlling handling of communications sessions.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating an application server of a network for controlling handling of a communication session, the method comprising:
  generating a script executable by a first user equipment, wherein execution of the script at the first user equipment controls handling of a communication session between the first user equipment and a second user equipment; and
  transmitting an establishment request to the first user equipment for the establishment of the communication session between the first user equipment and the second user equipment, wherein the establishment request comprises the script for execution at the first user equipment.

2. The method of claim 1, wherein the method comprises:
  receiving, from the first user equipment, an indication of one or more capabilities of the first user equipment; and
  generating the script executable by the first user equipment based on the one or more capabilities of the first user equipment.

3. The method of claim 2, wherein the method comprises:
  receiving, from the first user equipment, a registration request for the first user equipment to register with the application server;
  wherein the registration request comprises the indication of the one or more capabilities of the first user equipment.

4. The method of claim 1, wherein the method comprises generating the script executable by the first user equipment based on one or more current conditions in the network.

5. The method of claim 4, wherein the one or more conditions in the network comprise:
  a time in a geographical area of the network;
  a date and/or time in the network;
  a location of the first user equipment in the network;
  a location of the second user equipment in the network; and/or
  one or more other communication sessions established in the network.

6. The method of claim 1, wherein the method comprises:
  determining whether the first user equipment and/or second user equipment is trusted; and
  if the first user equipment and/or second user equipment is trusted, transmitting the establishment request comprising the script to the first user equipment.

7. The method of claim 1:
  wherein the establishment request comprises a session initiation protocol (SIP) session establishment request and the communication session comprises a SIP communication session; and/or
  the establishment request comprises a hypertext transfer protocol (HTTP) session establishment request and the communication session comprises a HTTP communication session.

8. An application server of a network, the application server comprising:
  processing circuitry;
  memory containing instructions executable by the processing circuitry whereby the application server is operative to:
    generate a script executable by a first user equipment, wherein execution of the script at the first user equipment controls handling of the communication session between the first user equipment and a second user equipment; and
    transmit an establishment request to the first user equipment for the establishment of the communication session between the first user equipment and the second user equipment, wherein the establishment request comprises the script for execution at the first user equipment.

9. A method of operating a first user equipment of a network for controlling handling of a communication session, the method comprising:
  receiving an establishment request from an application server for the establishment of a communication session between the first user equipment and a second user equipment, wherein the establishment request comprises a script executable by the first user equipment; and executing the script, wherein the execution of the script controls handling of the communication session at the first user equipment.

10. The method of claim 9, wherein the method comprises:

transmitting, to the application server, an indication of one or more capabilities of the first user equipment;

wherein the establishment request comprises a script generated based on the one or more capabilities of the first user equipment.

11. The method of claim 10, wherein the method comprises:

transmitting, to the application server, a registration request for the first user equipment to register with the application server;

wherein the registration request comprises the indication of the one or more capabilities of the first user equipment.

12. The method of claim 9, wherein the method comprises, prior to executing the script, determining that the establishment request is a multipart establishment request.

13. The method of claim 9, wherein the execution of the script at the first user equipment controls handling of the communication session by controlling the first user equipment to:

accept the establishment of the communication session; end the communication session at a predefined time; and/or render media at a user interface of the first user equipment.

14. The method of claim 9, wherein the method comprises receiving a user input associated with the handling of the communication session.

15. The method of claim 9, wherein the method comprises caching the script in a cache of scripts, wherein each script is cached with a unique identifier.

16. The method of claim 15:

wherein the script has an associated validity period; and
wherein the method comprises purging the script from the cache on expiry of the associated validity period.

17. A first user equipment of a network, the first user equipment comprising:

processing circuitry;

memory containing instructions executable by the processing circuitry whereby the first user equipment is operative to:

receive an establishment request from an application server for the establishment of a communication session between the first user equipment and a second user equipment, wherein the establishment request comprises a script executable by the first user equipment; and execute the script, wherein the execution of the script controls handling of the communication session at the first user equipment.

18. The first user equipment of claim 17, wherein the first user equipment comprises a communications interface configured to receive a user input associated with the handling of the communication session.

* * * * *